United States Patent [19]

Langer

[11] Patent Number: 5,523,059
[45] Date of Patent: Jun. 4, 1996

[54] INTUMESCENT SHEET MATERIAL WITH GLASS FIBERS

[75] Inventor: Roger L. Langer, Hudson, Wis.

[73] Assignee: Minnesota Mining and Manufacturing Company, St. Paul, Minn.

[21] Appl. No.: 497,102

[22] Filed: Jun. 30, 1995

[51] Int. Cl.$^6$ .............................. B01D 50/00; B32B 5/16
[52] U.S. Cl. .................... 422/179; 422/180; 422/221; 428/324; 428/328; 428/330; 428/331; 428/920; 252/378 R; 162/156; 106/DIG. 3
[58] Field of Search ................................. 428/324, 328, 428/330, 331, 332, 913, 920; 422/179, 180, 221; 60/299, 300; 106/DIG. 3; 252/606, 378 R; 162/156

[56] References Cited

U.S. PATENT DOCUMENTS

| | | | |
|---|---|---|---|
| Re. 27,747 | 9/1973 | Johnson | 165/166 |
| 3,001,571 | 9/1961 | Hatch | 154/2.6 |
| 3,441,381 | 4/1969 | Keith et al. | 23/288 |
| 3,709,706 | 1/1973 | Sowman | 106/57 |
| 3,795,524 | 3/1974 | Sowman | 106/65 |
| 3,916,057 | 10/1975 | Hatch et al. | 428/236 |
| 4,047,965 | 9/1977 | Karst et al. | 106/65 |
| 4,048,363 | 9/1977 | Langer et al. | 428/77 |
| 4,064,359 | 12/1977 | Peterson et al. | 174/107 |
| 4,087,039 | 5/1978 | Balluff | 228/173 R |
| 4,156,533 | 5/1979 | Close et al. | 277/229 |
| 4,269,807 | 5/1981 | Bailey et al. | 422/179 |
| 4,305,992 | 12/1981 | Langer et al. | 428/324 |
| 4,385,135 | 5/1983 | Langer et al. | 523/179 |
| 4,495,030 | 1/1985 | Giglia | 162/145 |
| 4,521,333 | 6/1985 | Graham et al. | 252/606 |
| 4,565,727 | 1/1986 | Giglia et al. | 428/172 |
| 4,617,176 | 10/1986 | Merry | 422/179 |
| 4,865,818 | 9/1989 | Merry et al. | 422/179 |
| 4,866,107 | 9/1989 | Doxsee et al. | 523/153 |
| 4,904,343 | 2/1990 | Giglia et al. | 162/145 |
| 4,929,429 | 5/1990 | Merry | 422/179 |
| 4,929,502 | 5/1990 | Giglia | 428/357 |
| 4,951,954 | 8/1990 | MacNeill | 277/230 |
| 4,999,168 | 3/1991 | Ten Eyck | 422/179 |
| 5,008,086 | 4/1991 | Merry | 422/180 |
| 5,045,385 | 9/1991 | Luckanuck | 428/220 |
| 5,126,013 | 6/1992 | Wiker et al. | 162/156 |
| 5,137,656 | 8/1992 | Conner | 252/378 R |
| 5,139,615 | 8/1992 | Conner et al. | 162/145 |
| 5,151,253 | 9/1992 | Merry et al. | 422/179 |
| 5,207,989 | 5/1993 | MacNeil | 422/179 |
| 5,242,871 | 9/1993 | Hashimoto et al. | 501/95 |
| 5,250,269 | 10/1993 | Langer | 422/179 |
| 5,254,410 | 10/1993 | Langer et al. | 428/402 |
| 5,290,522 | 3/1994 | Rogers et al. | 422/179 |
| 5,332,609 | 7/1994 | Corn | 428/77 |
| 5,384,188 | 1/1995 | Lebold et al. | 428/283 |
| 5,385,873 | 1/1995 | MacNeill | 501/95 |

FOREIGN PATENT DOCUMENTS

| | | |
|---|---|---|
| 639700A1 | 2/1995 | European Pat. Off. . |
| 639701A1 | 2/1995 | European Pat. Off. . |
| 639702A1 | 2/1995 | European Pat. Off. . |
| 3514150 | 4/1985 | Germany . |
| 1513808 | 6/1978 | United Kingdom . |
| 1522646 | 8/1978 | United Kingdom . |
| 1604908 | 12/1981 | United Kingdom . |

OTHER PUBLICATIONS

Stroom et al., "Systems Approach to Packaging Design for Automotive Catalytic Converters", Paper No. 900500, SAE Technical Paper Series, 1990.

Howitt, "Thin Wall Ceramics as Monolithic Catalyst Supports", Paper No. 800082, SAE Technical Paper Series, 1980.

Howitt et al., "FLow Effects in Monolithic Honeycomb Automotive Catalytic Converters", Paper No. 740244, SAE Technical Paper Series, 1974.

Howitt et al., "Cellular Ceramic Diesel Particulate Filter", Paper No. 810114, SAE Technical Paper Series, 1981.

*Primary Examiner*—N. Bhat
*Attorney, Agent, or Firm*—Gary L. Griswold; Walter N. Kirn

[57] ABSTRACT

The invention provides an intumescent sheet material comprising 25 to 60 dry weight percent of at least one unexpanded intumescent material, 25 to 60 dry weight percent of ceramic fibers, 0.5 to 5 dry weight percent of glass fibers having a diameter of less than about 2 microns, and 0.1 to 15 dry weight percent of organic binder, wherein said intumescent sheet material has a cold erosion rate of less than 0.05 grams/hour. The invention also provides catalytic converters and diesel particulate filters containing the sheet material.

17 Claims, No Drawings

INTUMESCENT SHEET MATERIAL WITH GLASS FIBERS

FIELD OF THE INVENTION

This invention relates to mounting materials for catalytic converters and diesel particulate filters or traps.

BACKGROUND OF THE INVENTION

Pollution control devices are universally employed on motor vehicles to control atmospheric pollution. Two types of devices are currently in widespread use–catalytic converters and diesel particulate filters or traps. Catalytic converters contain a catalyst, which is typically coated onto a monolithic structure in the converter. The catalyst oxidizes carbon monoxide and hydrocarbons, and reduces of the oxides of nitrogen in automobile exhaust gases to control atmospheric pollution. Diesel particulate filters or traps are wall flow filters which have honeycombed monolithic structures typically made from porous crystalline ceramic materials.

In the state of the art construction of these devices, each type of the these devices has a metal housing which holds within it a monolithic structure or element that can be metal or ceramic, and is most commonly ceramic. The ceramic monolith generally has very thin walls to provide a large amount of surface area so it is fragile and susceptible to breakage. It also has a coefficient of thermal expansion generally an order of magnitude less than the metal (usually stainless steel) housing in which it is contained. In order to avoid damage to the ceramic monolith from road shock and vibration, to compensate for the thermal expansion difference, and to prevent exhaust gases from passing between the monolith and the metal housing, ceramic mat or paste materials are typically disposed between the ceramic monolith and the metal housing.

The process of placing or inserting the mounting material is also referred to as canning and includes such processes as injecting a paste into a gap between the monolith and the metal housing, or wrapping a sheet or mat material around the monolith and inserting the wrapped monolith into the housing.

Typically, the mounting materials include inorganic binders, inorganic fibers that may also serve as a binder, intumescent materials, and optionally, organic binders, fillers, and other adjuvants. The materials are used as pastes, sheets, and mats. Ceramic mat materials, ceramic pastes, and intumescent sheet materials useful for mounting the monolith in the housing are described in, for example, U.S. Pat. Nos. 3,916,057 (Hatch et al.), 4,305,992 (Langer et al.), 4,385,135 (Langer et al.), 5,254,410 (Langer et al.), and 5,242,871 (Hashimoto et al.).

One of the shortcomings of the state of the art pastes and mats used for mounting is that the edges are subject to erosion from the pulsating hot exhaust gases. Under severe conditions, over a period of time, the mounting materials can erode and portions of the materials can be blown out. In time the mounting materials can fail to provide the needed protection the monolith.

Solutions to the problem include the use of a stainless steal wire screen (see e.g., U.S. Pat. No. 5,008,086 (Merry)) and braided or rope-like ceramic (i.e., glass, crystalline ceramic, or glass-ceramic) fiber braiding or metal wire material (see, e.g., U.S. Pat. No. 4,156,333 (Close et al.)), and edge protectants formed from compositions having glass particles (see, e.g., EP 0 639 700 A1 (Stroom et al.)) to protect the edge of the intumescent mat from erosion by exhaust gases.

While each of the various approaches to edge protection has its own utility, there remains an ongoing need to reduce the erosion of the mat materials used to mount the monoliths.

SUMMARY OF THE INVENTION

The invention provides an intumescent sheet material comprising 25 to 60 dry weight percent of at least one unexpanded intumescent material, 25 to 60 dry weight percent of ceramic fibers, 0.5 to 5 dry weight percent of glass fibers having a diameter of less than about 2 microns, and 0.1 to 15 dry weight percent of organic binder, wherein said intumescent sheet material has a cold erosion rate of less than 0.05 grams/hour. The invention also provides catalytic converters and diesel particulate filters containing the sheet material.

Additional features and advantages of the invention will be set forth in the description which follows, and in part will be apparent from the description, or may be learned by practice of the invention. The objectives and other advantages of the invention will be realized and attained by the methods and articles particularly pointed out in the written description and claims hereof.

It is to be understood that both the foregoing general description and the following detailed description are exemplary and explanatory and are intended to provide further explanation of the invention as claimed.

DETAILED DESCRIPTION OF THE INVENTION

The present invention provides a mat or sheet mounting material having superior erosion resistance for mounting fragile monolithic structures for use in demanding high temperature environments, such as would be encountered in catalytic converters and diesel particulate traps. The mounting materials of the invention comprise from about 25% to 60% by weight of ceramic fibers, from about 25% to about 60% by weight of at least one unexpanded intumescent material, 0.1% to 5% by weight of glass fibers having a diameter less than about 2.0 micrometers, and 0.1 to 15% organic binder.

In a preferred embodiment, the mounting materials are mats that are formed with compositions by known wet-laid or paper-making processes. The composition typically contain a large mount of water, i.e., greater than 95% water, with the solids well-dispersed with the mixture. The mixture is then quickly poured onto a screen and drained to form mats, which are then dried before using as a mounting material.

The glass fibers useful in the practice of the invention are glass microfibers having a diameter less than about 2.0 micrometers. Suitable glasses include borosilcate glasses such as calcium aluminoborosilicate, magnesium aluminoborosilicate, and alkali (e.g., sodium and potassium) borosilicate. Preferably, the fibers are made from alkali borosilicate glass. The term "glass" as used herein refers to an amorphous (i.e., a material having a diffuse x-ray diffraction pattern without definite lines to indicate the presence of a crystalline phase) inorganic oxide material. Suitable glass fibers have a softening point near the temperature of use. This temperature is typically below about 900 C., preferably below about 850 C., and most preferably below about 800 C. The term "softening point" refers to the temperature at which a glass in the form of a fiber of uniform diameter elongates at a specific rate under its own weight.

Suitable glass fibers are commercially available under the Micro-Strand™ MicroFibers™ trademark from Schuller Co. The glass fibers are useful in amounts from about 0.1% to about 5% by weight, and preferably from about 2% to 4%. When used in amounts greater that about 5%, the fibers can inhibit the draining of the composition in the wet-laid process used in making the mats. In the preferred embodiments, the glass fibers have a diameter less than about 1 micrometer.

The ceramic fibers provide resiliency and flexibility to sheet mounting materials prior to mounting in a catalytic converter as well as cohesive strength and resiliency to the mounting materials in use at high temperatures. Useful materials for fibers include graphite, alumina-silica, silica, and calcium-silica. Preferred materials include alumina-silica and calcium-silica.

Suitable fibers that are commercially available include alumino-silicate fibers such as FIBERFRAX 7000M fibers from Carborundum Company of Niagara Falls, N.Y., CERAFIBER from Thermal Ceramics of Augusta, Ga.

Suitable intumescent materials include unexpanded vermiculite, vermiculite ore, hydrobiotite, water swellable synthetic tetrasilicic fluorine type mica described in U.S. Pat. No. 3,001,571, alkali metal silicate granules as described in U.S. Pat. No. 4,521,333 (Graham et al.), and expandable graphite. Suitable intumescent materials also include Expantrol™ granules available from Minnesota Mining & Manufacturing Co., St. Paul, Minn. Preferred intumescent materials are unexpanded vermiculite, and vermiculite ore.

Resinous organic binders are added to improve the resiliency and strength of the sheet materials before and during canning.

Suitable organic binder materials include aqueous polymer emulsions, solvent-based polymers, and 100% solids polymers. Aqueous polymer emulsions are organic binders polymers and elastomers in the latex form (e.g., natural rubber latices, styrene-butadiene latices, butadiene-acrylonitrile latices, and latices of acrylate and methacrylate polymers and copolymers). Solvent-based polymeric binders can include a polymer such as an acrylic, a polyurethane, or a rubber-based organic polymer. The 100% solids polymers include natural rubber, styrene-butadiene rubber, and other elastomers.

Preferably, the organic binder material includes an aqueous acrylic emulsion. Acrylic emulsions are preferred because of their aging properties and noncorrosive combustion products. Useful acrylic emulsions include those commercially available under the trade designations "RHOPLEX TR-934" (a 44.5% by weight solids aqueous acrylic emulsion) and "RHOPLEX HA-8" (a 44.5% by weight solids aqueous emulsion of acrylic copolymers) from Rohm and Haas of Philadelphia, PA. A preferred acrylic emulsion is commercially available under the trade designation "NEOCRYL XA-2022" (a 60.5% solids aqueous dispersion of acrylic resin) from ICI Resins US of Wilmington, Mass., and Airflex™ 500BP DEV (55% by weight solids aqueous emulsion of theylene vinyl acetate acrylate terpolymer) from Air Products and Chemicals, Inc., Allentown, Pa.

Organic binder materials can include at least one plasticizer. Plasticizers tend to soften a polymer matrix and can contribute to the flexibility and moldability of the sheet materials made from the composition.

The organic binder materials are present in amounts of from about 0.1% to 15% by dry solids weight, and preferably 2% to 10%. The weight of the organic binder materials includes the polymer or copolymer solids and any plasticizer. In highly preferred embodiments, the organic binder is present in amounts of about 4% to 8% by weight.

Inorganic binder materials, such as clays, e.g., sepiolite and bentonite, colloidal silicas and aluminas, and alkali silicates, especially in amounts greater than about 5%, are preferably avoided because they tend to stiffen the sheets and make them less flexible. Inorganic fibers can also make the sheets less resilient.

In the practice of the invention, the ceramic fibers, the glass fibers, the intumescent agents, the organic binder, other fibers, and fillers, are mixed together. Optionally, water, dispersants, plasticizers, and surfactants can independently be added to aid in mixing the components together and/or to adjust the viscosity of the mixture.

Mat compositions are slurries which can be formed into sheets by traditional wet-laid non-woven papermaking techniques on commercially available equipment such as Fourdrinier machines. Briefly, this process includes pouring the slurry onto a wire mesh or screen, and either applying a vacuum to the screen to remove most of the water or simply allowing the slurry to drain on the screen by gravity. The formed sheet is then pressed and dried to form a resilient mat.

In another aspect, the invention provides for a catalytic converter or a diesel particulate filter using the mounting material of the invention. A catalytic converter or diesel particulate filter generally comprises a housing, a monolithic structure or element(s), and a mounting material disposed between the structure and the housing to hold the structure in place.

The housing which is also referred to as a can or a casing, can be made from suitable materials known in the art for such use and is typically made of metal. Preferably, the housing is made of stainless steel.

Suitable catalytic converter elements, also referred to a monoliths, are known in the art and include those made of metal or ceramic. The monoliths or elements are used to support the catalyst materials for the converter. A useful catalytic converter element is disclosed, for example, in U.S. Pat. No. RE 27,747 (Johnson).

Further, ceramic catalytic converter elements are commercially available, for example, from Coming Inc. of Coming, NY, and NGK Insulator Ltd. of Nagoya, Japan. For example, a honeycomb ceramic catalyst support is marketed under the trade designation "CELCOR" by Coming Inc. and "HONEYCERAM" by NGK Insulator Ltd. Metal catalytic converter elements are commercially available from Behr GmbH and Co. of Germany.

For additional details regarding catalytic monoliths see, for example, "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

The catalyst materials coated onto the catalytic converter elements include those known in the art (e.g., metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381 (Keith et al.).

Conventional monolithic type diesel particulate filter elements are typically wall flow filters comprised of honeycombed, porous, crystalline ceramic (e.g., cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Useful diesel particulate filter elements are commercially available, for example, from Corning Inc. of Corning, NY, and NGK Insulator Ltd. of Nagoya, Japan. Further, useful diesel particulate filter elements are discussed in "Cellular Ceramic Diesel Particulate Filter," Howitt et al., Paper No. 10114, SAE Technical Paper Series, 1981.

In use, the mounting materials of the invention are disposed between the monolith and the housing in similar fashion for either a catalytic converter or for a diesel particulate filter. This can be done by wrapping the monolith with a sheet of the mounting material, inserting the wrapped monolith into the housing, and sealing the housing.

Objects and advantages of this invention are further illustrated by the following examples, but the particular materials and amounts thereof recited in these examples, as well as other conditions and details, should not be construed to unduly limit this invention. All parts and percentages are by weight unless stated otherwise.

TEST METHODS

Hot Erosion Test

This test is designed to evaluate the ability of an intumescent mounting mat to resist edge erosion from an impinging hot air stream.

A sample of the intumescent mat was cut into a 4.6 cm by 4.9 cm rectangular shape and mounted between two independently electrically heated plates so that an edge of the cut mat was flush with the leading edges of two plates. The mat was then compressed to a mount density of 0.60 g/cm$^3$. The top plate was heated to 800 C. and the bottom plate was heated to 475 C. Air, heated to about 615 C., was then pulsed over the exposed edge of the mat at 60 times per minute through a circular 0.32 cm diameter round orifice of a nozzle positioned 1.588 cm from the edge of the mat. The gage pressure at the nozzle was about 0.19 megaPascals (27 psi). The test was terminated after 24 hours or when an erosion depth of 1.75 cm (0.5 inch) was reached. The amount of erosion was determined by comparing the weight of the mounting mat sample before and after the test. The erosion rate was determined by dividing the weight lost after the test by the time of the test.

Accelerated Hot Erosion

This test is designed to accelerate the hot erosion rates. It consists of exposing the mat samples mounted in the test plates to 900 C. for 1 hour prior to testing. After this preheating, hot erosion procedure as described above is followed.

Cold Erosion Test

This test is an accelerated test conducted under conditions that are more severe than actual conditions in a catalytic converter provides comparative data as to the erosion resistance of a mat mounting material.

A test sample is cut into a square measuring 2.54 cm by 2.54 cm, weighed, and mounted between two high temperature Inconel 601 steel plates using spacers to obtain a mount density of 0.700+/−0.005 g/cm$^3$. The test assembly is then heated for two hours at 800 C. and cooled to room temperature. The cooled test assembly is then positioned 3.8 mm in front of an air jet oscillating back and forth over the edge of the mat at 20 cycles per minute. This test is discontinued after 0.2 grams of material is lost or after 24 hours, whichever occurs first. The air jet impinges on the mat at a velocity of 305 meters per second. The erosion rate is determined by the weight loss divided by the time of the test and is reported in grams/hour (g/hr).

Example 1

A mat composition was prepared by adding 2.5 liters of water and 6.6 grams of glass microfibers (Micro-Stand™ Microfiber™ 106/475 available from Schuller, Denver, Colo.) and in 3.8 liter Waring blender set at low speed, blended for 15 seconds. 43.7 grams of ceramic fibers (Fiberfrax™ 7000M, available from Carborundum Company, Niagara Falls, N.Y.) were then added and blended for 15 seconds. The fiber slurry was then transferred to a 4 liter beaker using 1 liter of rinse water and mixed with a propeller blade air mixer. During mixing 17.1 grams of a 45.5% solids aqueous emulsion of acrylic copolymers (Rhoplex™ HA-8) were added and precipitated by adding enough 25% alum (aluminum sulfate solution known as papermaker's alum) solution to reduce the pH to a range from 4 to 5. During mixing, 73.2 grams of −18 mesh (less than 1 mm in size) vermiculite ore (available from Cometals, Inc., New York, N.Y.) was added. The mixture was vigorously agitated and then quickly poured into a 20 cm×20 cm sheet mold having an 80 mesh screen (Williams Apparatus Co., Watertown, N.Y.). The slurry was then dewatered immediately after pouring to minimize settling of the particles. The surface of the sheet was then blotted with paper and removed from the mold. The sheet was then sandwiched between additional blotter papers, pressed at 6 kiloPascals for 5 minutes, and dried on a sheet drier (Williams Apparatus Co.) for 45 minutes at 110 C. The resulting sheet had a thickness of 5.0 mm.

Examples 2–6 and Comparative Example C1

Mats were prepared as in Example 1 except that the sheets were either formed on a hand sheet mold (HS) or on a Fourdrinier or Rotoformer paper making machine (PM), and the amounts of glass microfibers were varied from 0.5% to 5% by dry weight as indicated in Table 1. The mats were tested for hot erosion and cold erosion according the above-described test procedures. Test results are shown in Table 1.

TABLE 1

| Example No. | 1 | 2 | 3 | 4 | 5 | 6 | C1 |
|---|---|---|---|---|---|---|---|
| Sheet Type | HS | PM | PM | PM | PM | PM | PM |
| % Glass Microfibers | 5.0 | 0.5 | 1.0 | 2.0 | 4.0 | 3.5 | 0 |
| Cold Erosion Resistance - g/hr | 0.0008 | 0.05 | 0.0044 | 0.0025 | 0.0010 | 0.0021 | 0.1 |

TABLE 1-continued

| Example No. | 1 | 2 | 3 | 4 | 5 | 6 | C1 |
|---|---|---|---|---|---|---|---|
| Hot Erosion Resistance - g/hr | — | 0.0039 | — | — | 0.0025 | — | 0.02 |
| Accelerated Hot Erosion Resistance - g/hr* | — | 1.91 | 0.752 | 0.137 | 0.085 | — | 4.54 |

The results in Table 1 show significant improvement in erosion resistance of the mat materials of the invention as compared to mat materials that have no glass microfibers.

It will be apparent to those skilled in the art that various modifications and variations can be made in the method and article of the present invention without departing from the spirit or scope of the invention. Thus, it is intended that the present invention cover the modifications and variations of this invention provided they come within the scope of the appended claims and their equivalents.

What is claimed is:

1. A catalytic converter comprising:
a metallic housing, a unitary, solid catalytic element disposed within said housing, and an intumescent sheet material positioned between said catalytic element and said housing, said intumescent material comprising 25 to 60 dry weight percent of at least one unexpanded intumescent material, 25 to 60 dry weight percent of ceramic fibers, 0.5 to 5 dry weight percent of glass fibers having a diameter of less than about 2 microns, and 0.1 to 15 dry weight percent of organic binder, wherein said intumescent sheet material comprises essentially no sepiolite and has a cold erosion rate of less than 0.05 grams/hour.

2. A diesel particulate filter comprising:
a metallic casing, a diesel particulate filter element disposed within the casing, and an intumescent sheet material disposed between the diesel particulate filter element and the metallic casing, said intumescent sheet material comprising 25 to 60 dry weight percent of at least one unexpanded intumescent material, 25 to 60 dry weight percent of ceramic fibers, 0.5 to 5 dry weight percent of glass fibers having a diameter of less than about 2 microns, and 0.1 to 15 dry weight percent of organic binder, wherein said intumescent sheet material comprises essentially no sepiolite and has a cold erosion rate of less than 0.05 grams/hour.

3. A flexible intumescent sheet material comprising 25 to 60 dry weight percent of at least one unexpanded intumescent material, 25 to 60 dry weight percent of ceramic fibers, 0.5 to 5 dry weight percent of glass fibers having a diameter of less than about 2 microns, and 0.1 to 15 dry weight percent of organic binder, wherein said intumescent sheet material comprises essentially no sepiolite and has a cold erosion rate of less than 0.05 grams/hour.

4. The flexible intumescent sheet material of claim 3, wherein the sheet material has a cold erosion rate of less than 0.01 grams/hour.

5. The flexible intumescent sheet material of claim 3, wherein the sheet material has a cold erosion rate of less than 0.006 grams/hour.

6. The flexible intumescent sheet material of claim 3, wherein said sheet material comprises from about 2 to about 4 dry weight percent of said glass fibers.

7. The flexible intumescent sheet material of claim 3, wherein said glass fibers have a diameter of less than 1 micron.

8. The flexible intumescent sheet material of claim 3, wherein said glass fibers have a diameter of about 0.6 microns.

9. The flexible intumescent sheet material of claim 6, wherein said glass fibers have a diameter of less than 1 micron.

10. The flexible intumescent sheet material of claim 3, wherein said sheet material comprises from 2 to 10 weight percent of organic binder.

11. The flexible intumescent sheet material of claim 10, wherein said organic binder is an acrylic binder.

12. The flexible intumescent sheet material of claim 10, wherein said sheet material comprises from 4 to 8 weight percent of organic binder.

13. The flexible intumescent sheet material of claim 3, wherein said unexpanded intumescent material is unexpanded vermiculite.

14. The flexible intumescent sheet material of claim 3, wherein said sheet material is a mat with a thickness greater than 1.5 mm.

15. The flexible intumescent sheet material of claim 3, wherein said ceramic fibers are aluminosilicate fibers.

16. The flexible intumescent sheet material of claim 3, wherein said sheet material comprises essentially no clays.

17. The flexible intumescent sheet material of claim 3, wherein said sheet material comprises essentially no clays, alkali metal silicates, colloidal silicas, or colloidal alumina.

* * * * *